US009115678B2

(12) United States Patent
Basmaji et al.

(10) Patent No.: US 9,115,678 B2
(45) Date of Patent: Aug. 25, 2015

(54) MAGNETIZED FUEL INJECTOR VALVE AND VALVE SEAT

(75) Inventors: Joseph Basmaji, Waterford, MI (US); Gopichandra Surnilla, West Bloomfield, MI (US); Anand Gandhi, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 506 days.

(21) Appl. No.: 13/571,242

(22) Filed: Aug. 9, 2012

(65) Prior Publication Data

US 2014/0041639 A1 Feb. 13, 2014

(51) Int. Cl.
*F02M 51/06* (2006.01)
*F16K 31/08* (2006.01)
*F02D 41/20* (2006.01)

(52) U.S. Cl.
CPC ........... *F02M 51/0689* (2013.01); *F02D 41/20* (2013.01); *F02D 2041/2037* (2013.01); *F02D 2041/2048* (2013.01)

(58) Field of Classification Search
CPC ....... F02M 51/06; F02M 55/02; F02M 59/00; F02M 39/00; F16K 31/08; B05B 1/30
USPC ............ 123/490, 472, 476; 239/585.1, 585.4, 239/585.5; 251/165, 129.15, 129.21
See application file for complete search history.

(56) References Cited

U.S. PATENT DOCUMENTS

| | | | | |
|---|---|---|---|---|
| 5,975,053 A | 11/1999 | Rodier | | |
| 6,412,713 B2 | 7/2002 | Okajima et al. | | |
| 6,606,978 B2 | 8/2003 | Sugimoto et al. | | |
| 6,612,539 B1 | 9/2003 | Ruehle et al. | | |
| 6,679,435 B1 | 1/2004 | Noller et al. | | |
| 6,874,710 B2 * | 4/2005 | Ishii et al. | .................. | 239/585.1 |

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

Systems and methods for a permanently magnetized valve mechanism and/or valve mechanism seat for a fuel injector are disclosed. In one example approach, a fuel injector comprises a valve mechanism and a valve mechanism seat, wherein at least one of the valve mechanism and the valve mechanism seat is permanently magnetized; an injector driver circuit for actuating the valve mechanism; and a spring biasing the valve mechanism in a closed position against the valve mechanism seat. For example, a first amount of current may be supplied in a first direction to the injector driver to lift a permanently magnetized injector valve mechanism from the injector valve mechanism seat, and a second amount of current may be supplied in a second direction to the injector driver to close the permanently magnetized injector valve mechanism onto the injector valve mechanism seat.

18 Claims, 4 Drawing Sheets

MAGNETIZED FUEL INJECTOR VALVE AND VALVE SEAT

BACKGROUND AND SUMMARY

Fuel injectors may be used to inject fuel from a fuel source into combustion engines. For example, fuel injectors may inject fuel directly into combustion chambers of an engine in what is known as direct injection or fuel injectors may inject fuel into an intake passage of an engine in what is known as port injection.

Fuel injectors have moving parts that control fuel flow through the injector. For example, a fuel injector may include a valve mechanism which engages with a valve mechanism seat to close off fuel delivery to an engine. A valve actuator, e.g., an electromagnetic valve actuator, may actuate the valve mechanism to lift it from the valve mechanism seat so that fuel may be delivered to the engine during fuel injection events.

However, the inventors herein have recognized that the moving parts in a fuel injector, such as those described above, may bounce against each other during motion. This bouncing may lead to degradation in components and operation of the fuel injector. For example, the bouncing may lead to fuel leaking through the injector causing fuel to drip into the engine. The dripped fuel may increase particulate matter (PM) formation during engine combustion, for example. Further, the leaking fuel is unmetered and may cause fueling control issues. The leaking fuel may also lead to deposit formation on the injector tip, thereby changing the injector flow transfer function and spray quality, for example. Further, due to the bouncing of the injector, there may be a limit on how quickly the injector can be opened for subsequent injections. Further still, the bouncing may increased injector tick noise and wear on injector components.

In one example approach to at least partially address these issues, a fuel injector comprises a valve mechanism and a valve mechanism seat, wherein at least one of the valve mechanism and the valve mechanism seat is permanently magnetized; an injector driver circuit for actuating the valve mechanism; and a spring biasing the valve mechanism in a closed position against the valve mechanism seat.

In this way, since at least one of the valve mechanism and the valve mechanism seat is permanently magnetized, a magnetic force may attract the valve mechanism to the valve mechanism seat which may reduce bouncing when the valve mechanism engages with the valve seat. This reduction in bouncing may reduce undesired residual fuel leaking when the injector is closed leading to a reduction in the formation of particulate matter and particulate emissions. Further, an accuracy of fuel metering may be increased due to a decrease in fuel leakage. For example, with reduced injector bounce, injector closing times may be reduced and injector response times may be increased. Further still, fuel velocity and inertia may be increased so that the time between subsequent injections may be reduced, which may, for example, increase split injection performance.

Further, if the valve mechanism is permanently magnetized, then the injector driver circuit may be operated in two modes depending on the direction of current supplied thereto. For example, a first amount of current may be supplied in a first direction to the injector driver to lift the permanently magnetized injector valve mechanism from the injector valve mechanism seat, and a second amount of current may be supplied in a second direction to the injector driver to close the permanently magnetized injector valve mechanism onto the injector valve mechanism seat.

In this way, for example, a polarity of the injector driver may be reversed to oppose the valve mechanism to seat attraction, thereby reducing the speed of the valve mechanism near closing and creating a soft landing effect. This may reduce tick noise and stress on fuel injector components. For example, initial spring forces on the valve mechanism and wear on a contact surface between the valve mechanism and the seat may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
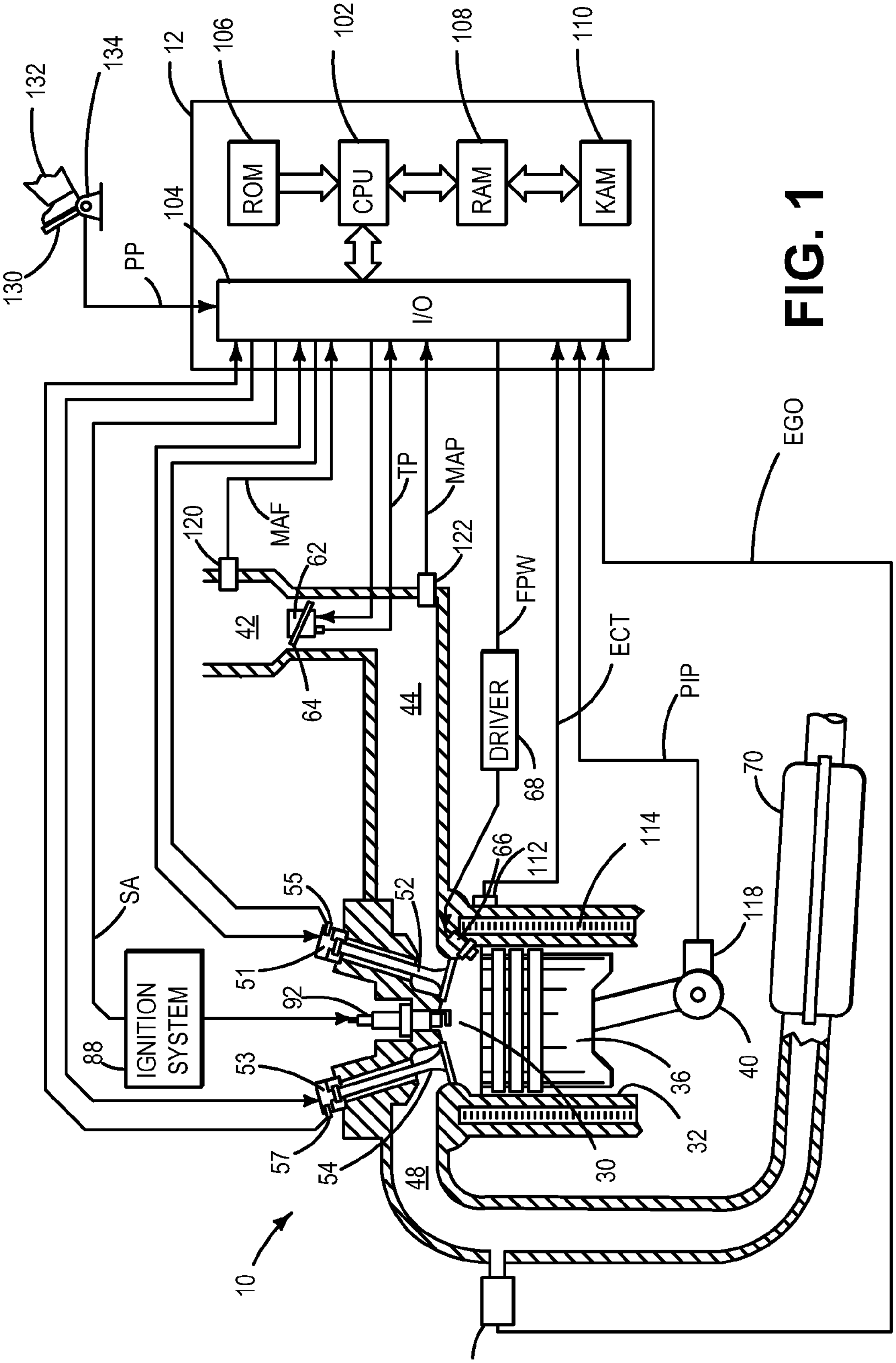
FIG. 1 shows a schematic diagram of one cylinder of an example engine system.

The present disclosure is directed to systems and methods for a permanently magnetized valve mechanism and/or valve mechanism seat of a fuel injector for a combustion engine, such as the example engine shown in FIG. 1. Such fuel injectors may be included in a fuel system, such as the example fuel system shown in FIG. 2, to inject fuel from a fuel source into the combustion engine. As remarked above, fuel injectors, such as the example fuel injector shown in FIG. 3, have moving parts that control fuel flow through the injector. For example, a fuel injector may include a valve mechanism which engages with a valve mechanism seat to close off fuel delivery to an engine. A valve actuator, e.g., an electromagnetic valve actuator, may actuate the valve mechanism to lift it from the valve mechanism seat so that fuel may be delivered to the engine during fuel injection events. In order to reduce bouncing and wear of components and operation of a fuel injector, some components of the fuel injector may be permanently magnetized as described in more detail below. Such fuel injectors may then be operated, for example as shown in the example method of FIG. 4, to inject fuel into the engine.

Turning to the figures, FIG. 1 shows a schematic diagram of one cylinder of multi-cylinder engine 10, which may be included in a propulsion system of an automobile, for example. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system described in further detail in FIG. 2. In some embodiments, combustion chamber 30 may alternatively or additionally include a fuel injector arranged in intake passage 44 in a configuration that provides what is known as port injection of fuel into the intake port upstream of combustion chamber 30. For example, a gasoline engine may employ direct injection fuel injectors (DI) whereas a diesel engine may employ port fuel injectors (PFI) to deliver fuel to the engine for combustion. Further, as described below, one or more components of a fuel injector may be permanently magnetized so that some injector components are magnetically attracted or repelled from one another. Such magnetizations may be used to advantage in the reduction of component bouncing, component stress, and component wear. Further, such magnetizations among components of the injector may be used to assist control of fuel injector components during operation as described below.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Further, it will be appreciated that the fuel system may provide various signals and/or information to the controller and will be discussed in further detail with reference to FIG. 2.

Note that FIG. 1 shows only one cylinder of a multi-cylinder engine, and that each cylinder may similarly include its own set of intake/exhaust manifold valves, fuel injector, spark plug, etc. In one example, the engine cylinders may operate in a particular predetermined firing order, as determined by the valve timing.

Figure 2:
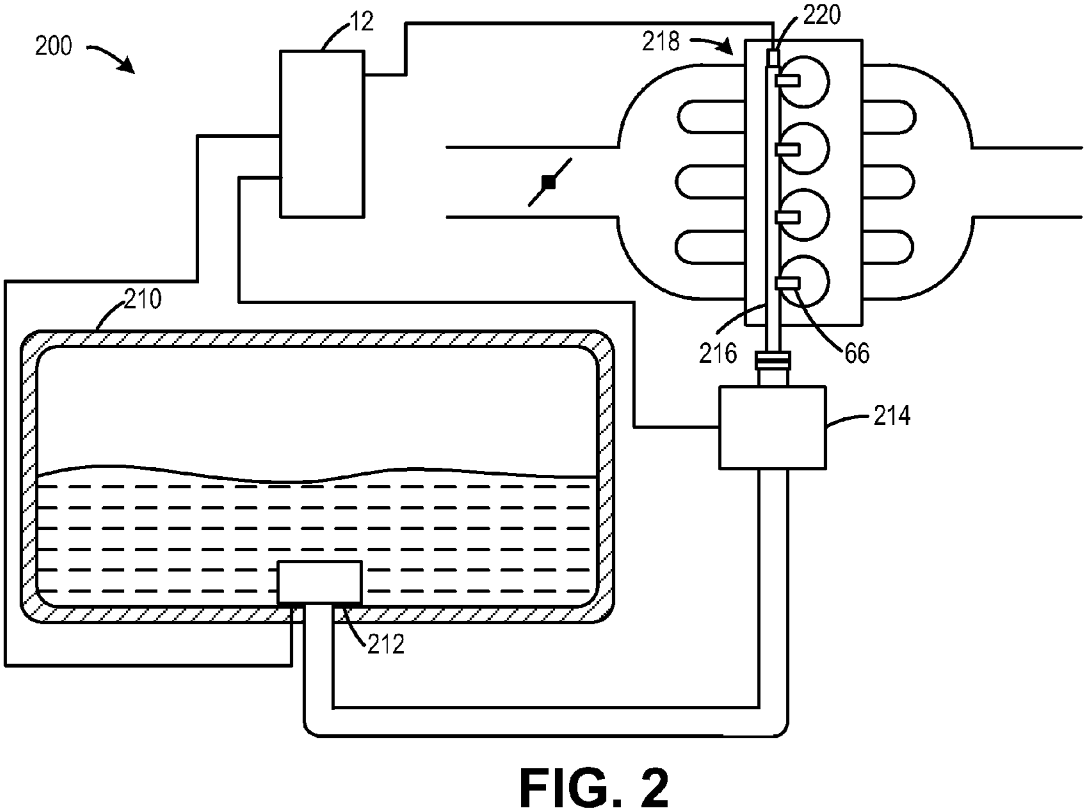
FIG. 2 shows a schematic diagram of an example fuel system.

Referring now to FIG. 2, an example fuel system with high pressure direct fuel injection is schematically shown at 200. Fuel system 200 may include fuel tank 210 is shown with a first fuel pump 212, which may be mounted internal, adjacent, or external to fuel tank 210. The first fuel pump 212 may be referred to as a low pressure pump and may increase fuel pressure to a moderate pressure level (e.g. approximately 4 bar). Pressurized fuel may exit the first pump 212 and may be delivered to a second fuel pump 214 which may be referred to as a high pressure pump, that may increase the fuel pressure to a substantially higher pressure level (e.g. approximately 50-150 bar), depending on operating conditions. The second fuel pump 214 may deliver pressurized fuel to fuel rail 216, which then distributes the fuel to a plurality of direct fuel injectors 218, one of which may be fuel injector 66.

Fuel pressure may be measured by fuel rail pressure sensor 220. Fuel rail pressure sensor 220 may send pressure measurement signals to controller 12 in order to control fuel pressure throughout various operating conditions. In particular, first fuel pump 212 and second fuel pump 214 may be in communication with controller 12 and may receive command signals to adjust fuel pressure based on various operating conditions and/or modes of engine operation. In one example, the second fuel pump 214 may have an adjustable pump stroke that may be adjusted by controller 12 to vary the increase in fuel pressure generated depending on operating conditions.

Note that while FIG. 2 shows various direct connections, such as between the first and second pumps, various additional valves, filters, and/or other devices may be intermediately connected, yet still enable the first and second pumps to be coupled. Further, while FIG. 2 shows an example direct injector system, in some examples, a port fuel injection system may be used, e.g., in diesel engines.

Figure 3:
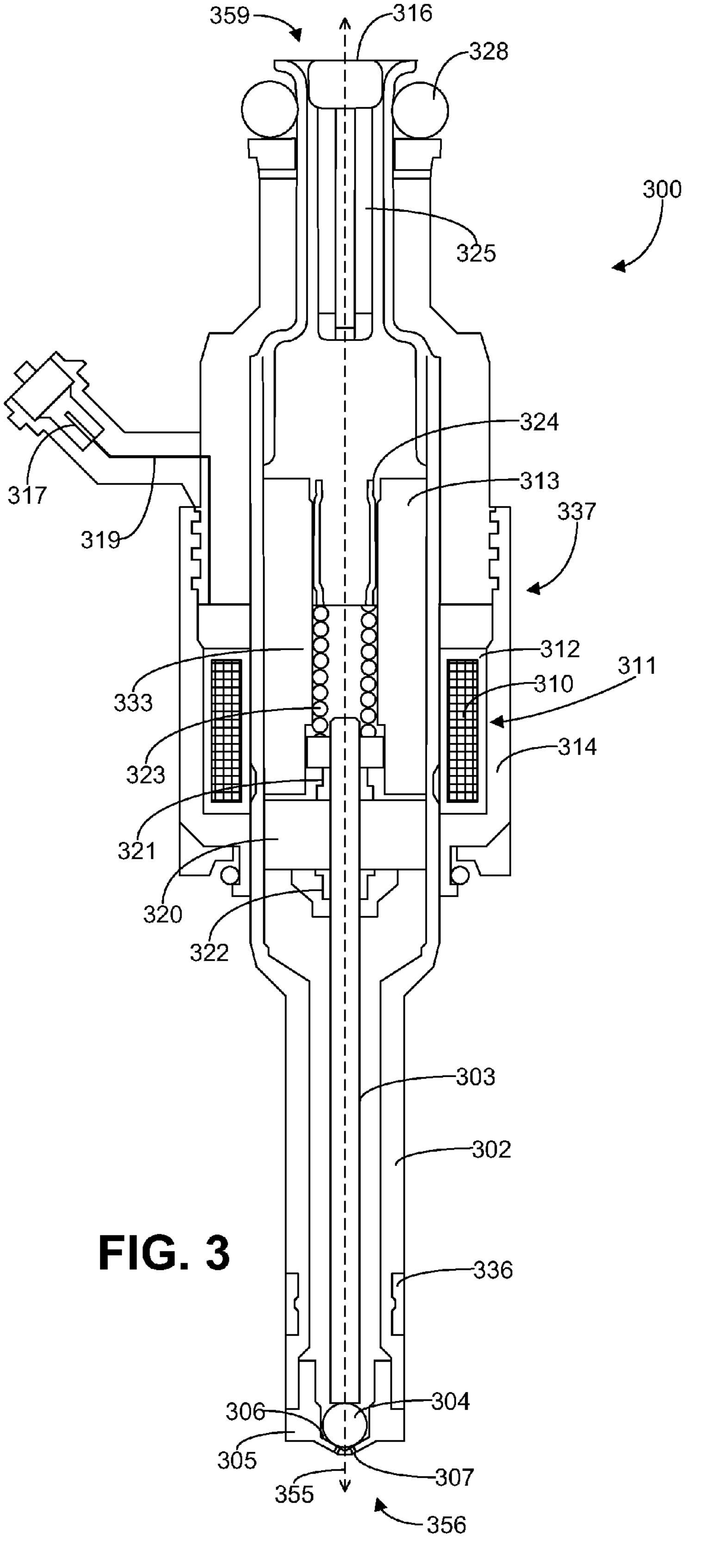
FIG. 3 shows a schematic diagram of an example fuel injector.

FIG. 3 shows a schematic diagram of an example fuel injector 300 which may be used to supply fuel from a fuel system, e.g., fuel system 200, to an engine, e.g., engine 10. Fuel injector 300 may be any type of injector. For example, fuel injector 300 may be a direct injector or a port fuel injector. As described below, various components of fuel injector 300 may be permanently magnetized in order to reduce bouncing of components during operation of the fuel injector and to assist in control operations.

Fuel injector 300 includes a nozzle body 302 which may be used as valve-seat support and part of a valve housing. A valve mechanism 303 within nozzle body 302 is displaceable in an axial direction, e.g., along a central axis 355 of fuel injector 300. Valve mechanism may be a pintle or needle which is slideable in a direction of central axis 355, for example. In some examples, valve mechanism may be composed at least partially of a material that is permanently magnetized. For example, valve mechanism 303 may be composed of a material, such as iron, which can be magnetized by an external magnetic field and remain magnetized after the external field is removed. In other examples, valve mechanism 303 may be substantially composed of a ferromagnetic material, such as iron, nickel, cobalt and/or alloys thereof.

Fuel injector 300 may be an inwardly opening fuel injector, which has at least one spray-discharge orifice 307 formed in valve-seat body 305 so that when an injector driver circuit 311 is activated to actuate the valve mechanism, the valve mechanism 303 lifts off from the valve mechanism seat 305 to create a gap between valve closure member 304 and valve seat surface 306 so that fuel may flow out orifices 307.

Valve mechanism 303 is coupled to a valve-closure member 304, which cooperates with a valve-seat surface 306 formed on a valve mechanism seat body 305 to form a sealing seat. Valve mechanism seat body 305 may be fixedly coupled to the downstream end 356 of nozzle body 302. However, valve-seat surface 306 may also be formed directly on a base part of nozzle body 302. For example, valve-closure member 304 may be ball-shaped or frustoconical-shaped so that in a closed position valve-closure member 304 engages with valve-seat surface 306 to shut off fuel flow through the fuel injector via orifices, e.g., orifices 307, in the downstream end 356 of the fuel injector.

In some examples, valve-closure member 304 may be composed substantially of a permanently magnetized material instead of, or in addition to, valve mechanism 303 being composed of a permanently magnetic material. In the case when the valve mechanism and/or valve-closure member are permanently magnetized, valve seat 305 and/or valve seat surface 306 may be composed of a ferromagnetic material so that valve mechanism 303 is magnetically attracted to valve seat 305. In this way, the attracting magnetic force between the valve mechanism and valve seat may reduce bouncing when the valve mechanism and valve seat come into contact.

As another example, valve mechanism 303 and/or valve-closure member 304 may be substantially composed of a ferromagnetic material. In this example, valve seat 305 and/or valve seat surface 306 may be composed of a permanently magnetized material so that the valve mechanism and the valve mechanism seat are magnetically attracted to each other.

As still another example, both the valve mechanism and the valve seat may be permanently magnetized so that an attracting magnetic force is present between the two components. In this case, the magnetic dipole of the magnetized valve mechanism may be substantially anti-parallel to a magnetic dipole of the valve mechanism seat. For example, the magnetic dipole of the valve mechanism may be positioned approximately 180° with respect to the magnetic dipole of the valve seat or in a suitable range thereof, for example between 90° and 270° with respect to the magnetic dipole of the valve seat. For example, a magnetic dipole of the valve mechanism may extend along a central axis 355 of the fuel injector from downstream end 356 to upstream end 359 whereas the magnetic dipole moment of the valve seat may extend along an opposite direction, namely along the central axis 355 from the upstream end 359 to the downstream end 356. In this way, the poles of the magnetized valve mechanism and the magnetized valve seat are attracted to each other via the magnetic fields present in the valve mechanism and the valve seat.

In some examples, valve mechanism 303 may penetrate an armature 320 in an inner opening in an upstream valve housing 337. Armature 320 may be coupled to valve mechanism 303 so as to be axially displaceable along a direction of central axis 355. The path of magnetic armature 320 in the direction of the central axis 355 may be restricted by a first, upper flange 321, which may be integrally formed with an upstream portion of valve mechanism 303, and a second, lower flange 322, which is coupled to valve mechanism 303 downstream of armature 320. Braced on first flange 321 is a restoring spring 323 which biases the valve mechanism 303 in a closed position against the valve mechanism seat 305. Restoring spring 323 may be pre-stressed by an adjustment sleeve 324.

Upstream valve housing 337 includes an injector driver 311 which actuates the valve mechanism in response to a start of injection (SOI) event. The injector driver 311 may include an electromagnetic actuator for actuating the valve mechanism and may include a magnetic coil 310 wound onto a coil brace 312, which rests against a connection piece 313 acting as inner pole 333. Current may be supplied in magnetic coil in two opposite directions and at varying amounts depending on operating conditions. In an outward direction from central axis 355, the magnetic circuit may be sealed by an outer magnetic component 314. Magnetic coil 310 is energized via a line 19 by an electric current that may be supplied via an electric plug contact 317.

The fuel is supplied via a central fuel supply 316 at an upstream end 359 of fuel injector 300 and filtered by a filter element 325 inserted therein. Fuel injector 300 may be sealed from a fuel distributor line, e.g., fuel rail 216, by a seal 328 and from a cylinder head, e.g., cylinder 30, by another seal 336.

In particular, fuel injector 300 may receive fuel pulse width signal FPW from controller 12 to control fuel injection. Signal FPW governs fuel injection by energizing electromagnetic actuator coil 310 to initiate the start of injection (SOI) of fuel from fuel injector 300. Additionally, FPW may dictate the end of injection (EOI) of fuel from fuel injector 300. In particular, during fuel injection, pressurized fuel may be supplied from fuel rail 216 (shown in FIG. 2) to fuel injector 300 via inlet 316, the flow of which is governed by electromagnetic actuator having coil 310, coupled to valve mechanism 303 which lifts from valve seat 305 to spray fuel into cylinder 30.

In operation, restoring spring 323 acts upon first flange 321 of valve needle 303 to counter to its lift direction, so that valve-closure member 304 is retained in sealing contact against valve seat surface 306. Excitation of magnetic coil 310 may be performed by supplying a first amount of current in a first direction through magnetic coil 310. The first amount current in the first direction generates a magnetic field which attracts valve mechanism 303 upwards to lift valve mechanism 303 off of valve seat 305. For example, the magnetic field may move magnetic armature 320 in the lift direction to counter to the spring force of restoring spring 323. The overall lift of the valve mechanism may be defined by a working gap existing between connection piece 313 and magnetic armature 320 in the rest position. Magnetic armature 320 carries along first flange 321 in the lift direction as well. Valve-closure member 34, which is connected to valve mechanism 303, lifts off from valve seat surface 306 and the fuel is spray-discharged through spray-discharge orifices 307.

In the case where the valve mechanism in composed of a permanently magnetized material, a magnetic field is present in the valve mechanism, e.g., a magnetic dipole moment of the valve mechanism may extend along a direction of a central axis of the valve mechanism. In this case, the direction of current supplied to injector driver 311 may be chosen so that the magnetic field generated by magnetic coil 310 has a magnetic dipole moment opposite in direction to the magnetic dipole moment of the valve mechanism so that the magnetic field generated by magnetic coil 310 attracts the permanently magnetized valve mechanism to lift the valve mechanism from the valve mechanism seat. In this example, an amount of current supplied to the injector driver may be reduced since the magnetic field in the valve mechanism provides additional force to lift the valve mechanism.

In response to a end of injection event, the first amount of current supplied to injector driver 311 in the first direction is discontinued, and following sufficient decay of the magnetic field, magnetic armature 320 drops away from connection piece 313 due to the pressure of restoring spring 323, so that valve mechanism 303 moves counter to the lift direction. Valve closure member 304 sets down on valve seat surface 306, and fuel injector 300 is closed again.

In some examples, in the case where the valve mechanism in composed of a permanently magnetized material, in response to a end of injection event a magnetic field a second amount of current may be supplied in a second direction to injector driver 311 to assist in closing the valve mechanism against the valve seat. In this case, the direction of current supplied to injector driver 311 may be chosen so that the magnetic field generated by magnetic coil 310 has a magnetic dipole moment with the same direction as the magnetic dipole moment of the valve mechanism so that the magnetic field generated by magnetic coil 310 repels the permanently magnetized valve mechanism to force the valve mechanism onto the valve mechanism seat. In this way, the injector may be forced onto the seat at a higher force than what the restoring spring provides alone.

In still other examples, a second amount of current supplied to injector driver 311 during an injector closing event may be provided to oppose a magnetic attraction between the valve mechanism and valve seat, e.g., when the valve mechanism and/or valve seat are permanently magnetized. In particular, the second amount of current may be supplied in a second direction to injector driver 311 to dampen the motion in closing the valve mechanism against the valve seat. In this case, the direction of current supplied to injector driver 311 may be chosen so that the magnetic field generated by magnetic coil 310 has a magnetic dipole moment with the opposite direction as the magnetic dipole moment of the valve mechanism so that the magnetic field generated by magnetic coil 310 attracts the permanently magnetized valve mechanism to buffer the force exerted on the valve mechanism by the restoring spring. In this case, the second amount of current supplied to the valve mechanism may be chosen so as to generate a force of attraction between the magnetic field generated by the magnetic coil and the magnetic field of the valve mechanism that is less than the force exerted by restoring spring 323 onto valve mechanism 303. Further, in some examples, the second amount of current may be varied through the valve mechanism closing process. For example, the second amount of current may decrease until the valve mechanism engages with the seat so as to provide a soft landing effect.

Figure 4:
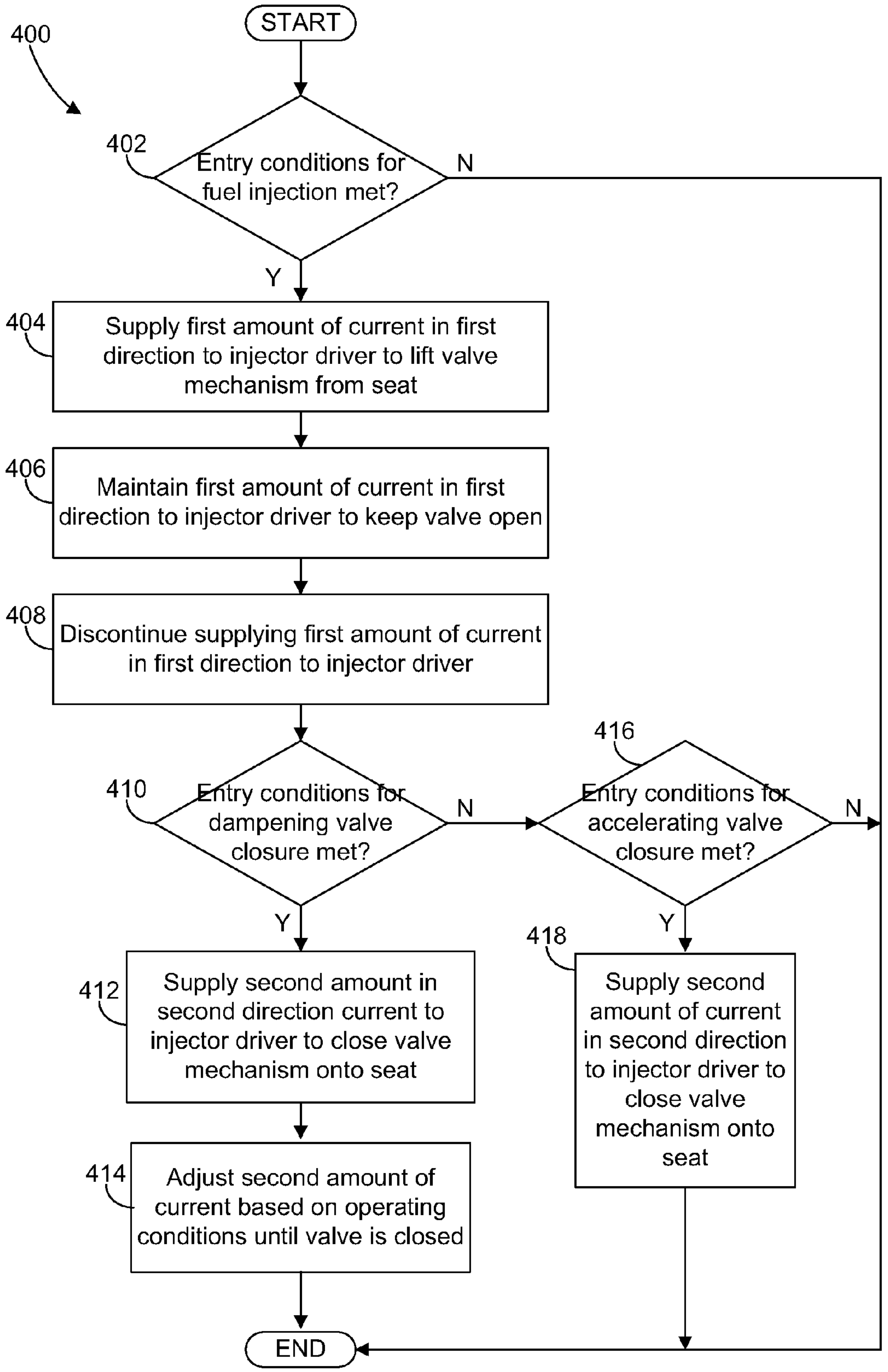
FIG. 4 shows an example method for an engine with a fuel injector in accordance with the disclosure.

FIG. 4 shows an example method 400 for an engine with a fuel injector, such as the example fuel injector shown in FIG. 3. In particular, method 400 is directed to operating a fuel injector with a permanently magnetized valve mechanism and/or valve mechanism seat as described above.

At 402, method 400 includes determining if entry conditions for a fuel injection event are met. For example, entry conditions may include a start of injection event as described above. In particular, fuel injector 300 may receive fuel pulse width signal FPW from controller 12 to control fuel injection. Signal FPW governs fuel injection by energizing electromagnetic actuator coil 310 to initiate the start of injection (SOI) of fuel from fuel injector 300. Entry conditions may further be based on a fuel pressure supplied to the fuel injector, as measured by a pressure sensor in the fuel rail for example.

If entry conditions for a fuel injection event are met at 402, method 400 proceeds to 404. At 404, method 400 includes supplying a first amount of current in a first direction to an injector driver to lift an injector valve mechanism from an injector valve mechanism seat. The first amount of current in a first direction supplied to the injector driver may be chosen to overcome a spring force biasing the valve mechanism in a closed position against the valve mechanism seat and a magnetic force between the valve mechanism and the valve seat to lift the injector valve mechanism from the injector valve mechanism seat. Thus the first amount of current may be based on a fuel pressure reading in the fuel rail, for example.

At 406, method 400 includes maintaining the first amount of current in the first direction to the injector driver to keep the injector valve open or lifted off from the injector valve seat. For example, the first amount of current in the first direction may be supplied to the injector driver based on a fuel pulse width or a desired amount of fuel to be injected into the engine during the current fuel injection event.

At 408, method 400 includes discontinuing the supply of the first amount of current in the first direction to the injector driver. For example, in response to an end of injection event, the first amount of current supplied to injector driver 311 in the first direction may be discontinued so that a spring force of restoring spring 323 begins to return valve mechanism 303 to a closed position against valve seat 305.

At 410, method 400 includes determining if entry conditions for dampening closing of the injector valve are met. For example, during high fuel pressure conditions in the fuel rail a dampening of the closure of the valve mechanism on the seat may be performed as described below. Thus, in some examples, entry conditions for dampening the closing of the injector valve may include a fuel rail pressure greater than a threshold value. Entry conditions for dampening the closing of the injector valve may further be based on an age of the injector or injector components, and whether or not the valve mechanism is magnetized.

If entry conditions for dampening the closing of the injector valve are met at 410, method 400 proceeds to 412. At 412, method 400 includes supplying a second amount of current in a second direction to the injector driver to dampen the closure of the injector valve mechanism onto the injector valve mechanism seat. For example, as described above, the second amount of current supplied to injector driver 311 during an injector closing event may be provided to oppose a magnetic attraction between the valve mechanism and valve seat, e.g., when the valve mechanism and/or valve seat are permanently magnetized. In particular, the second amount of current may be supplied in a second direction to injector driver 311 to dampen the motion in closing the valve mechanism against the valve seat. In this case, the direction of current supplied to injector driver 311 may be chosen so that the magnetic field generated by magnetic coil 310 has a magnetic dipole moment with the opposite direction as the magnetic dipole moment of the valve mechanism so that the magnetic field generated by magnetic coil 310 attracts the permanently magnetized valve mechanism to buffer the force exerted on the valve mechanism by the restoring spring. In this case, the second amount of current supplied to the valve mechanism may be chosen so as to generate a force of attraction between the magnetic field generated by the magnetic coil and the magnetic field of the valve mechanism that is less than the force exerted by restoring spring 323 onto valve mechanism 303. In this case, the second amount of current may be lower than the first amount of current.

At 414, method 400 includes adjusting the second amount of current supplied to the injector driver based on operating conditions until the valve is closed. For example, the second amount of current may be varied through the valve mechanism closing process. For example, the second amount of current may decrease or decay until the valve mechanism engages with the seat so as to provide a soft landing effect. Further, the second amount of current may be adjusted based on a closing spring force applied to the magnetized injector valve mechanism. The amount and rate of current decrease may be based on a fuel pulse width signal, a spring constant of the restoring spring, and various other engine operating conditions.

If entry conditions for dampening valve closure are not met at 410, method 400 proceeds to 416 to determine if entry conditions for accelerating or assisting valve closure are met. For example, an acceleration of closure of the valve mechanism may be desired to further reduce component bouncing and/or during low pressure fuel conditions. Thus entry conditions for magnetic assistance in closing of the injector valve are met may include a fuel rail pressure less than a threshold value. Entry conditions for accelerating or assisting the closing of the injector valve may further be based on an age of the injector or injector components, and whether or not the valve mechanism is magnetized.

If entry conditions for accelerating or assisting the closing of the injector valve are met at 416, method 400 proceeds to 418. At 418, method 400 includes supplying a second amount of current in a second direction to the injector driver to accelerate the closure of the injector valve mechanism onto the injector valve mechanism seat.

For example, as described above, in the case where the valve mechanism in composed of a permanently magnetized material, a second amount of current may be supplied in a second direction to injector driver 311 to assist in closing the valve mechanism against the valve seat. In this case, the direction of current supplied to injector driver 311 may be chosen so that the magnetic field generated by magnetic coil 310 has a magnetic dipole moment with the same direction as the magnetic dipole moment of the valve mechanism so that the magnetic field generated by magnetic coil 310 repels the permanently magnetized valve mechanism to force the valve mechanism onto the valve mechanism seat. In this way, the injector may be forced onto the seat at a higher force than what the restoring spring provides alone.

If entry conditions for accelerating or assisting the closing of the injector valve are not met at 416, then the restoring spring force together with the magnetic attraction between the valve mechanism and valve seat are used to close the valve mechanism onto the valve mechanism seat thus reducing bouncing of the valve mechanism from the valve mechanism seat via the magnetic attraction.

It will be appreciated that the configurations and methods disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel injector for an engine, comprising:

a valve mechanism and a valve mechanism seat, wherein both the valve mechanism and the valve mechanism seat are permanently magnetized and wherein a magnetic dipole of the valve mechanism is substantially anti-parallel to a magnetic dipole of the valve mechanism seat;

an injector driver circuit for actuating the valve mechanism; and a spring biasing the valve mechanism in a closed position against the valve mechanism seat.

2. The fuel injector of claim 1, wherein the valve mechanism is permanently magnetized and the valve mechanism seat is ferromagnetic.

3. The fuel injector of claim 1, wherein the valve mechanism seat is permanently magnetized and the valve mechanism is ferromagnetic.

4. The fuel injector of claim 1, wherein the valve mechanism includes a pintle and a ball coupled to a downstream end of the pintle, and where the ball engages with the valve mechanism seat in the closed position.

5. The fuel injector of claim 4, wherein the ball is a permanent magnet and the valve mechanism seat is composed of a ferromagnetic material.

6. A method for an engine with a fuel injector, comprising:

supplying a first amount of current in a first direction to an injector driver to lift a permanently magnetized injector valve mechanism from an injector valve mechanism seat; and supplying a second amount of current in a second direction to the injector driver to close the permanently magnetized injector valve mechanism onto the injector valve mechanism seat.

7. The method of claim 6, wherein the valve mechanism seat is ferromagnetic.

8. The method of claim 6, wherein the valve mechanism seat is permanently magnetized and wherein a magnetic dipole of the valve mechanism is substantially anti-parallel to a magnetic dipole of the valve mechanism seat.

9. The method of claim 6, wherein the valve mechanism includes a pintle and a ball coupled to a downstream end of the pintle, and where the ball engages with the valve mechanism seat in response to supplying a second amount of current in a second direction to the injector driver.

10. The method of claim 6, wherein the second amount of current is based on a fuel pressure of fuel supplied to the injector.

11. The method of claim 6, wherein the second amount of current is based on a closing spring force applied to the magnetized injector valve mechanism.

12. The method of claim 6, wherein the first direction is different from the second direction.

13. The method of claim 6, wherein the first direction is the same as the second direction and the first amount of current is greater than the second amount of current.

14. The method of claim 6, wherein the first direction is different from the second direction.

15. The method of claim 6, wherein the first direction is the same as the second direction and the first amount of current is greater than the second amount of current and the second amount of current is based on a closing spring force applied to the magnetized injector valve mechanism and a fuel pressure of fuel supplied to the injector.

16. A method for an engine with a fuel injector, comprising:

supplying a first amount of current in a first direction to an injector driver to overcome a spring force biasing the valve mechanism in a closed position against the valve mechanism seat and a magnetic force between the valve mechanism and the valve seat to lift the injector valve mechanism from the injector valve mechanism seat.

17. The method of claim 16, further comprising:

supplying a second amount of current in a second direction to the injector driver to close the permanently magnetized injector valve mechanism onto the injector valve mechanism seat.

18. The method of claim 16, wherein the valve mechanism seat is permanently magnetized and wherein a magnetic dipole of the valve mechanism is substantially anti-parallel to a magnetic dipole of the valve mechanism seat.

* * * * *